United States Patent
Kilgard et al.

(10) Patent No.: US 7,009,615 B1
(45) Date of Patent: Mar. 7, 2006

(54) FLOATING POINT BUFFER SYSTEM AND METHOD FOR USE DURING PROGRAMMABLE FRAGMENT PROCESSING IN A GRAPHICS PIPELINE

(75) Inventors: Mark J. Kilgard, Austin, TX (US); Patrick R. Brown, Raleigh, NC (US)

(73) Assignee: NVIDIA Corporation, Santa Clara, CA (US)

( * ) Notice: Subject to any disclaimer, the term of this patent is extended or adjusted under 35 U.S.C. 154(b) by 155 days.

(21) Appl. No.: 10/006,477

(22) Filed: Nov. 30, 2001

(51) Int. Cl.
  *G06T 1/20* (2006.01)
(52) U.S. Cl. ...................................... 345/506; 345/545
(58) Field of Classification Search ............ 345/545–6, 345/552, 553, 555, 501, 506, 522, 549, 422, 345/582, 614, 643, 561, 562, 589, 591
  See application file for complete search history.

(56) References Cited

U.S. PATENT DOCUMENTS

| | | | |
|---|---|---|---|
| 4,996,666 A | 2/1991 | Duluk, Jr. | 365/49 |
| 5,535,288 A | 7/1996 | Chen et al. | 382/236 |
| 5,572,634 A | 11/1996 | Duluk, Jr. | 395/119 |
| 5,574,835 A | 11/1996 | Duluk, Jr. et al. | 395/121 |
| 5,596,686 A | 1/1997 | Duluk, Jr. et al. | 395/122 |
| 5,669,010 A | 9/1997 | Duluk, Jr. | 395/800.22 |
| 5,977,987 A | 11/1999 | Duluk, Jr. | 345/441 |
| 6,229,553 B1 | 5/2001 | Duluk, Jr. et al. | 345/506 |
| 6,268,875 B1 | 7/2001 | Duluk, Jr. et al. | 345/506 |
| 6,285,378 B1 | 9/2001 | Duluk, Jr. | 345/441 |
| 6,288,730 B1 | 9/2001 | Duluk, Jr. et al. | 345/552 |
| 6,469,704 B1 * | 10/2002 | Johnson | 345/553 |
| 6,650,327 B1 * | 11/2003 | Airey et al. | 345/422 |
| 2002/0180741 A1 * | 12/2002 | Fowler et al. | 345/520 |

FOREIGN PATENT DOCUMENTS

| | | |
|---|---|---|
| WO | 93/23816 | 11/1993 |
| WO | 97/05575 | 2/1997 |
| WO | 97/05576 | 2/1997 |
| WO | 00/10372 | 3/2000 |
| WO | 00/11562 | 3/2000 |
| WO | 00/11602 | 3/2000 |
| WO | 00/11603 | 3/2000 |
| WO | 00/11604 | 3/2000 |
| WO | 00/11605 | 3/2000 |
| WO | 00/11607 | 3/2000 |
| WO | 00/11613 | 3/2000 |
| WO | 00/11614 | 3/2000 |
| WO | 00/19377 | 4/2000 |

OTHER PUBLICATIONS

Deering, Michael F., and Nelson, Scott R., Leo: A System for Cost Effective 3D Shaded Graphics, Proceedings of the 20th Annual Conference on Computer Graphics and Interactive Techniques, ACM Press, NY, NY, Sep., 1993, pp. 101-108.*

Deering, Michael F., and Nelson, Scott R., Leo: A System for Cost Effective 3D Shaded Graphics, Proceedings of the 20th Annual Conference on Computer Graphics and Interactive Techniques, ACM Press, NY, NY, Sep., 1993, pp. 101-108.*

(Continued)

*Primary Examiner*—Kee M. Tung
(74) *Attorney, Agent, or Firm*—Zilka-Kotab, PC

(57) ABSTRACT

A system, method and computer program product are provided for buffering data in a computer graphics pipeline. Initially, graphics floating point data is read from a buffer in a graphics pipeline. Next, the graphics floating point data is operated upon in the graphics pipeline. Further, the graphics floating point data is stored to the buffer in the graphics pipeline.

27 Claims, 5 Drawing Sheets

OTHER PUBLICATIONS

Mark Segal et al., The OpenGL® Graphics System: A Specification (Version 1.2.1), Apr. 1, 1999.
Olano, Marc, A Programmable Pipeline for Graphics Hardware, 1998, University of North Carolina at Chjapel Hill.
Anselmo Lastra et al., Real-Time Programmable Shading, 1995, Chapel Hill, NC.
Mark S. Peercy et al., Interactive Multi-Pass Programmable Shading, 2000.
Peercy, Mark S. et al. "Interactive Multi-Pass Programmable Shading" Proceedings of SIGGRAPH 2000, New Orleans, Louisiana, Jul. 23-28, 2000.
NV_register_combiners specification, http://oss.sgi.com/projects/ogl-sample/registry/NV/register_combiners.txt.
NV_register_combiners2 specification, http://oss.sgi.com/projects/ogl-sample/registry/NV/register_combiners2.txt.
NV_texture_shader specification, http://oss.sgi.com/projects/ogl-sample/registry/NV/texture_shader.txt.
NV_texture_shader2 specification, http://oss.sgi.com/projects/ogl-sample/registry/NV/texture_shader2.txt.
NV_texture_shader3 specification, http://oss.sgi.com/projects/ogl-sample/registry/NV/texture_shader3.txt.

* cited by examiner

```
                                            Init.
Get Value                     Type  Get Command  Value  Description               Sec.   Attribute
---------------------------   ----- -----------  -----  ------------------------  -----  ------------
TEXTURE_FLOAT_COMPONENTS_NV   n x B GetTexLevel-   0    True if texture holds     3.8     -
                                                        unclamped floating-
                                                        point values Init.
Get Value                     Type  Get Command  Value    Description               Sec.   Attribute
---------------------------   ----  -----------  -------  ------------------------  -----  ------------
CLEAR_COLOR_VALUE              C    GetFloatv    0,0,0,0  Color buffer clear value  4.2.3  color-buffer
                                                          (RGBA mode), each value
                                                          clamped to [0,1].
FLOAT_CLEAR_COLOR_VALUE_NV    4xR   GetFloatv    0,0,0,0  Color buffer clear value  4.2.3  color-buffer
                                                          (RGBA mode), each value
                                                          unclamped.

Init.
Get Value             Type  Get Command  Value  Description               Sec.  Attribute
------------------    ----  -----------  -----  ------------------------  ----  ----------
FLOAT_RGBA_MODE_NV     B    GetBooleanv    -    True if color buffers      4     -
                                                store floating-point
                                                data
```

Figure 5

FLOATING POINT BUFFER SYSTEM AND METHOD FOR USE DURING PROGRAMMABLE FRAGMENT PROCESSING IN A GRAPHICS PIPELINE

FIELD OF THE INVENTION

The present invention relates to computer graphics, and more particularly to fragment processing in a graphics pipeline.

BACKGROUND OF THE INVENTION

Conventional fragment processing for three-dimensional (3-D) graphics programming application program interfaces (APIs) such as Open Graphics Library (OpenGL®) and Direct3D™ provide support for per-fragment operations. The computations provided by such conventional fragment processing are routinely implemented by 3-D graphics hardware that greatly accelerates these operations.

Unextended OpenGL mandates a certain set of configurable per-fragment computations defining texture lookup, texture environment, color sum, and fog operations. Each of these areas provides a useful but limited set of fixed operations. For example, unextended OpenGL 1.2.1 provides only four texture environment modes, color sum, and three fog modes.

One drawback associated with the current state of the art graphics APIs is that most computations dealing with color or depth buffers are typically constrained to operate on values in the range [0,1]. Computational results are also typically clamped to the range [0,1]. Color, texture, and depth buffers themselves also hold values mapped to the range [0, 1]. Unfortunately, these constraints and the limited precision of typical computations can result in reduced accuracy during graphics processing.

Further, some $_{[0]}$ quantities that users of programmable graphics APIs would like to compute do not necessarily correspond in number or in range to conventional attributes such as RGBA colors or depth values. Because of the range and precision constraints imposed by conventional fixed-point color buffers, it may be difficult (if not impossible) to use them to implement certain multi-pass algorithms where the intermediate results need to be stored in the frame buffer.

There is thus a need for an application program interface that provides a frame buffer and texture format that allows fragment programs and other applications to read and write unconstrained floating point data.

DISCLOSURE OF THE INVENTION

A system, method and computer program product are provided for buffering data in a computer graphics pipeline. Graphics floating point data is produced in a graphics pipeline. The graphics floating point data are operated upon in the graphics pipeline. Further, the graphics floating point data is stored to the buffer in the graphics pipeline.

In one embodiment, the graphics floating point data may be read and stored in an unclamped format for increasing a precision and/or range thereof. Further, the precision of the graphics floating point data so processed may be only may be only constrained by an underlying data type.

As an option, the graphics floating point data may include fragment data, color data, depth data, etc. Such fragment data may be received from a rasterizer.

In another embodiment, the buffer may serve as a texture map. Optionally, the graphics floating point data may be packed and/or unpacked, whereby a technique is provided for encoding and decoding multiple low-precision data items stored in a single higher-precision data format.

Another system, method and computer program product are provided for buffering data during multi-pass rendering in a computer graphics pipeline. Initially, graphics floating point data are operated on during a rendering pass in a graphics pipeline. During this operation, graphics floating point data may be read from a buffer. Further, the graphics floating point results produced by the rendering pass are stored to the buffer. During use, the foregoing operations may be repeated during additional rendering passes.

As an option, the operating step may include deferred shading, where computationally expensive fragment operations may be deferred until it is known that the fragment will be visible in the final rendered scene.

These and other advantages of the present invention may become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which:

FIG. 5 illustrates new states that may be relevant in the context of the present embodiment.

DESCRIPTION OF THE PREFERRED EMBODIMENTS

Figure 1:
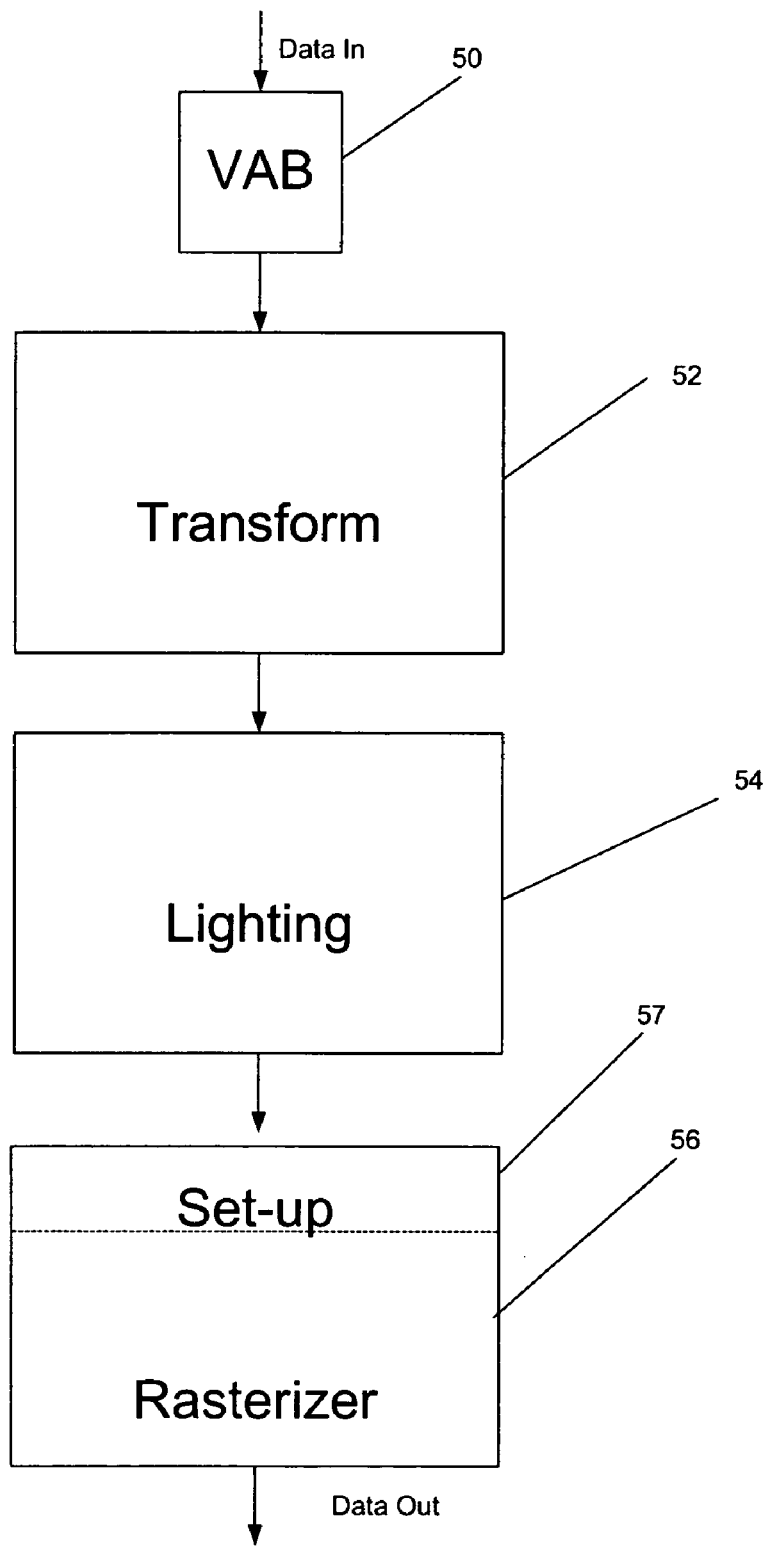
FIG. 1 is a diagram illustrating the various components of one embodiment of the present invention.

FIG. 1 is a diagram illustrating the various components of one embodiment of the present invention. As shown, the present embodiment includes a plurality of modules having a vertex attribute buffer (VAB) 50, a transform module 52, a lighting module 54, and a rasterization module 56 with a set-up module 57.

As an option, each of the foregoing modules may be situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the present invention may also be implemented on multiple semiconductor platforms and/or utilizing a conventional CPU and bus implementation.

During operation, the VAB 50 is included for gathering and maintaining a plurality of vertex attribute states such as position, normal, colors, texture coordinates, etc. Completed vertices are processed by the transform module 52 and then sent to the lighting module 54. The transform module 52 generates vectors for the lighting module 54 to light. The output of the lighting module 54 is screen space data suitable for the set-up module 57 which, in turn, sets up primitives. Thereafter, rasterization module 56 carries out rasterization of the primitives.

An interface may be used in conjunction with the various components set forth in FIG. 1. In one embodiment, such interface may include at least in part the Open Graphics Library (OpenGL®), Direct3D™ application program interfaces (APIs), a proprietary application program interface, or the like. OpenGL® is the computer industry's standard application program interface (API) for defining 2-D and 3-D graphic images. With OpenGL®, an application can create the same effects in any operating system using any OpenGL-adhering graphics adapter. OpenGL® specifies a set of commands or immediately executed functions. Each command directs a drawing action or causes special effects. OpenGL® and Direct3D™ APIs are commonly known to those of ordinary skill, and more information on the same may be found by reference to the OpenGL® Specification Version 1.3 which is incorporated herein by reference in its entirety.

As is well known, OpenGL® mandates a certain set of configurable per-fragment computations defining texture lookup, texture environment, color sum, and fog operations. Several extensions have been developed to provide further per-fragment computations to OpenGL®.

Each of such extensions adds a small set of relatively inflexible per-fragment computations. As mentioned earlier, this inflexibility is in contrast to the typical flexibility provided by the underlying programmable floating point engines (whether micro-coded vertex engines, digital signal processors (DSPs), or central processor units (CPUs)) that are traditionally used to implement OpenGL's per-fragment computations.

Figure 2:
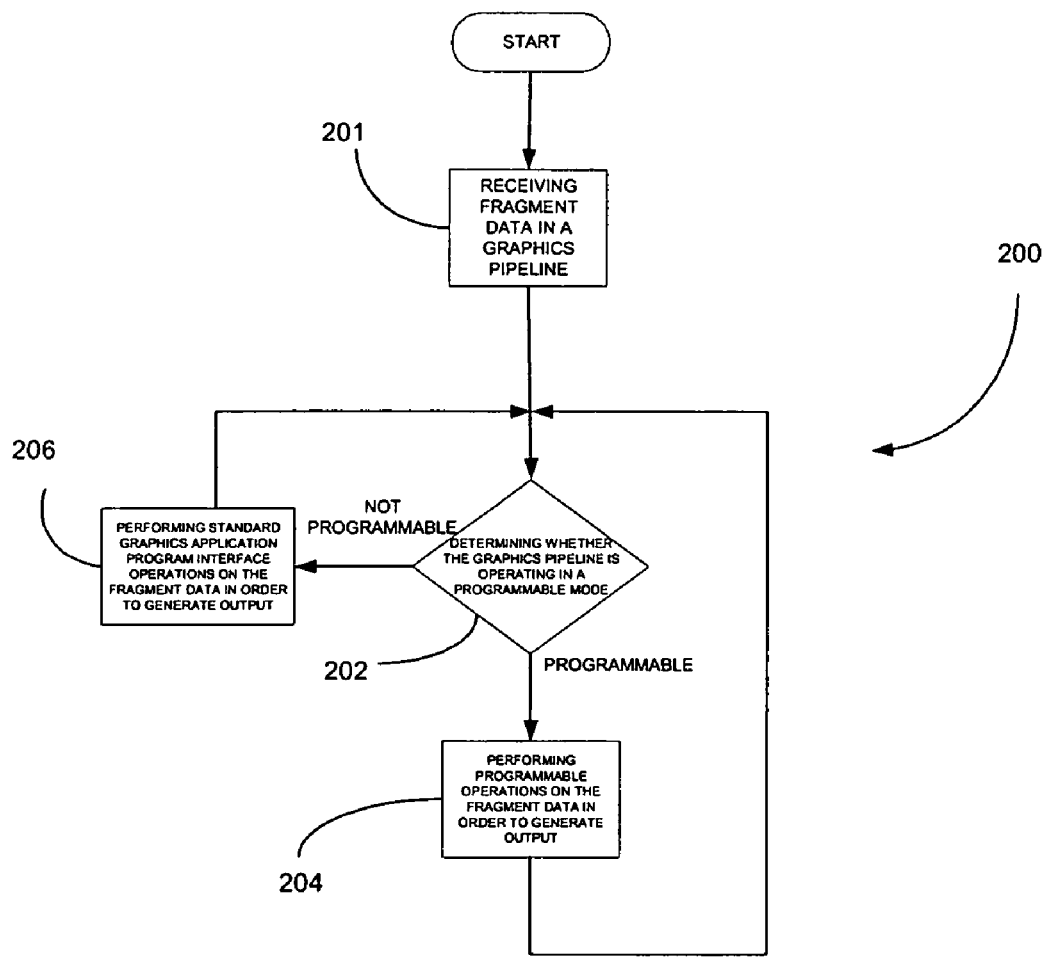
FIG. 2 illustrates a method for programmable fragment processing, in accordance with one embodiment.

FIG. 2 illustrates a method 200 for programmable fragment processing, in accordance with one embodiment. Initially, in operation 201, fragment data is received in a graphics pipeline. As an option, the fragment data may be received from a rasterizer such as that shown in FIG. 1. It should be noted, however, that the receipt of the fragment data may occur at any point in the graphics pipeline. For example, such receipt may occur in a portion thereof where the following operations are being performed.

As an option, the fragment data may include constant registers associated with a fragment, attributes associated with a fragment, color values, etc. Further, the attributes may include texture coordinates. It should be noted that the fragment data may include any type of data associated with fragments. In the context of the present description, a fragment includes any entity generated by rasterization of primitives.

Next, in decision 202, it is determined whether the graphics pipeline is operating in a programmable mode. This may be accomplished via any type of signal or command. Just by way of example, a command associated with an application program interface may indicate whether the graphics pipeline is operating in the programmable mode. Such command may optionally be called by a program which governs operation of the graphics pipeline via the application program interface.

If it is determined that the graphics pipeline is operating in the programmable mode, programmable operations are performed on the fragment data in order to generate output. See operation 204.

In one embodiment, the programmable operations may include retrieving texture data. In particular, such texture data may be retrieved utilizing arbitrary texture coordinates. In such embodiment, the fragment program execution environment may access textures via arbitrarily computed texture coordinates. As such, there is no necessary correspondence between the texture coordinates and texture maps previously lumped into a single "texture unit". This technique enables implementations where the number of texture coordinate sets and texture image units may differ, providing methods for querying the number of each supported by the implementation.

In another embodiment, the programmable operations may include mathematical computations. Further, the programmable operations may include a kill operation, a partial derivative operation, a texture mapping operation, among others. As an option, a packing operation (i.e. PK2, PK4, etc.) and/or an unpacking operation (i.e. UP2, UP4, etc.) may be employed.

The PK2/PK4/UP2/UP4 instructions may allow one to store more than four (4) quantities in a single buffer in a single pass, assuming it is acceptable to store them at lower precision. The PK2/PK4/UP2/UP4 instructions may be useful for packing multiple attribute sets into a "wide" frame buffer. For example, a 128-bit "RGBA" frame buffer could pack 16 8-bit quantities or 8 16-bit quantities, all of which could be used in later rasterization passes.

PK2: Pack Two 16-bit Floats

The PK2 instruction converts the "x" and "y" components of the single operand into 16-bit floating-point format, packs the bit representation of these two floats into a 32-bit value, and replicates that value to all four components of the result vector. The PK2 instruction can be reversed by the UP2 instruction mentioned below. See Table #1A.

TABLE #1A

```
tmp0 = VectorLoad(op0);
/* result obtained by combining raw bits of tmp0.x, tmp0.y */
result.x = RawBits(tmp0.x) | (RawBits(tmp0.y) << 16);
result.y = RawBits(tmp0.x) | (RawBits(tmp0.y) << 16);
result.z = RawBits(tmp0.x) | (RawBits(tmp0.y) << 16);
result.w = RawBits(tmp0.x) | (RawBits(tmp0.y) << 16);
```

PK4: Pack Four Signed 8-bit Values

The PK4 instruction converts the four components of the single operand into 8-bit signed quantities. The signed quantities are represented in a bit pattern where all '0' bits corresponds to −128/127 and all '1' bits corresponds to +127/127. The bit representation of the four converted components are packed into a 32-bit value, and that value is replicated to all four components of the result vector. The PK4 instruction can be reversed by the UP4 instruction below. See Table #1B.

TABLE #1B

```
tmp0 = VectorLoad(op0);
if (tmp0.y < −128/127) tmp0.y = −128/127;
if (tmp0.z < −128/127) tmp0.z = −128/127;
if (tmp0.w < −128/127) tmp0.w = −128/127;
if (tmp0.x > +127/127) tmp0.x = +127/127;
if (tmp0.y > +127/127) tmp0.y = +127/127;
if (tmp0.z > +127/127) tmp0.z = +127/127;
if (tmp0.w > +127/127) tmp0.w = +127/127;
ub.x = round(127.0 * tmp0.x + 128.0); /* ub is a ubyte vector */
ub.y = round(127.0 * tmp0.y + 128.0);
ub.z = round(127.0 * tmp0.z + 128.0);
ub.w = round(127.0 * tmp0.w + 128.0);
/* result obtained by combining raw bits of ub. */
result.x = ((ub.x) | (ub.y << 8) | (ub.z << 16) | (ub.w << 24));
result.y = ((ub.x) | (ub.y << 8) | (ub.z << 16) | (ub.w << 24));
result.z = ((ub.x) | (ub.y << 8) | (ub.z << 16) | (ub.w << 24));
result.w = ((ub.x) | (ub.y << 8) | (ub.z << 16) | (ub.w << 24));
```

UP2: Unpack Two 16-Bit Floats

The UP2 instruction unpacks two 16-bit floats stored together in a 32-bit scalar operand. The first 16-bit float (stored in the 16 least significant bits) is written into the "x" and "z" components of the result vector; the second is written into the "y" and "w" components of the result vector.

This operation undoes the type conversion and packing performed by the PK2 instruction. See Table #1C.

TABLE #1C

```
tmp = ScalarLoad(op0);
result.x = (fp16) (RawBits(tmp) & 0xFFFF);
result.y = (fp16) ((RawBits(tmp) >> 16) & 0xFFFF);
result.z = (fp16) (RawBits(tmp) & 0xFFFF);
result.w = (fp16) ((RawBits(tmp) >> 16) & 0xFFFF);
```

The scalar operand may be loaded from a 32-bit temporary register. A fragment program may fail to load if any other register type is specified.

UP4: Unpack Four Signed 8-Bit Values

The UP4 instruction unpacks four 8-bit signed values packed together in a 32-bit scalar operand. The signed quantities are encoded where a bit pattern of all '0' bits corresponds to −128/127 and a pattern of all '1' bits corresponds to +127/127. The "x" component of the result vector is the converted value corresponding to the 8 least significant bits of the operand; the "w" component corresponds to the 8 most significant bits.

This operation undoes the type conversion and packing performed by the PK4 instruction. See Table #1D.

TABLE #1D

```
tmp = ScalarLoad(op0);
result.x = (((RawBits(tmp) >> 0) & 0xFF) − 128) / 127.0;
result.y = (((RawBits(tmp) >> 8) & 0xFF) − 128) / 127.0;
result.z = (((RawBits(tmp) >> 16) & 0xFF) − 128) / 127.0;
result.w = (((RawBits(tmp) >> 24) & 0xFF) − 128) / 127.0;
```

The scalar operand may be loaded from a 32-bit temporary register. A fragment program may fail to load if any other register type is specified.

More information on various programmable operations will be set forth hereinafter in greater detail.

It should be noted that the output of the programmable operations may include any desired values that may be used for graphics processing. For example, the output of the programmable operations may include color values associated with a fragment. Such output of the programmable operations may also include depth values associated with a fragment.

As another option, the fragment data may be operated upon in a form which includes four-component vectors in a floating point representation for reasons that will soon become apparent. In particular, the present technique may define a programming model including a 4-component vector instruction set, 16- and 32-bit floating-point data types, and a relatively large set of temporary registers.

In still yet another embodiment, the programmable operations may be performed utilizing register combiners (i.e., NV_register_combiners extension) and/or in the context of multi-texturing (i.e. ARB_multitexture extension).

Figure 3:
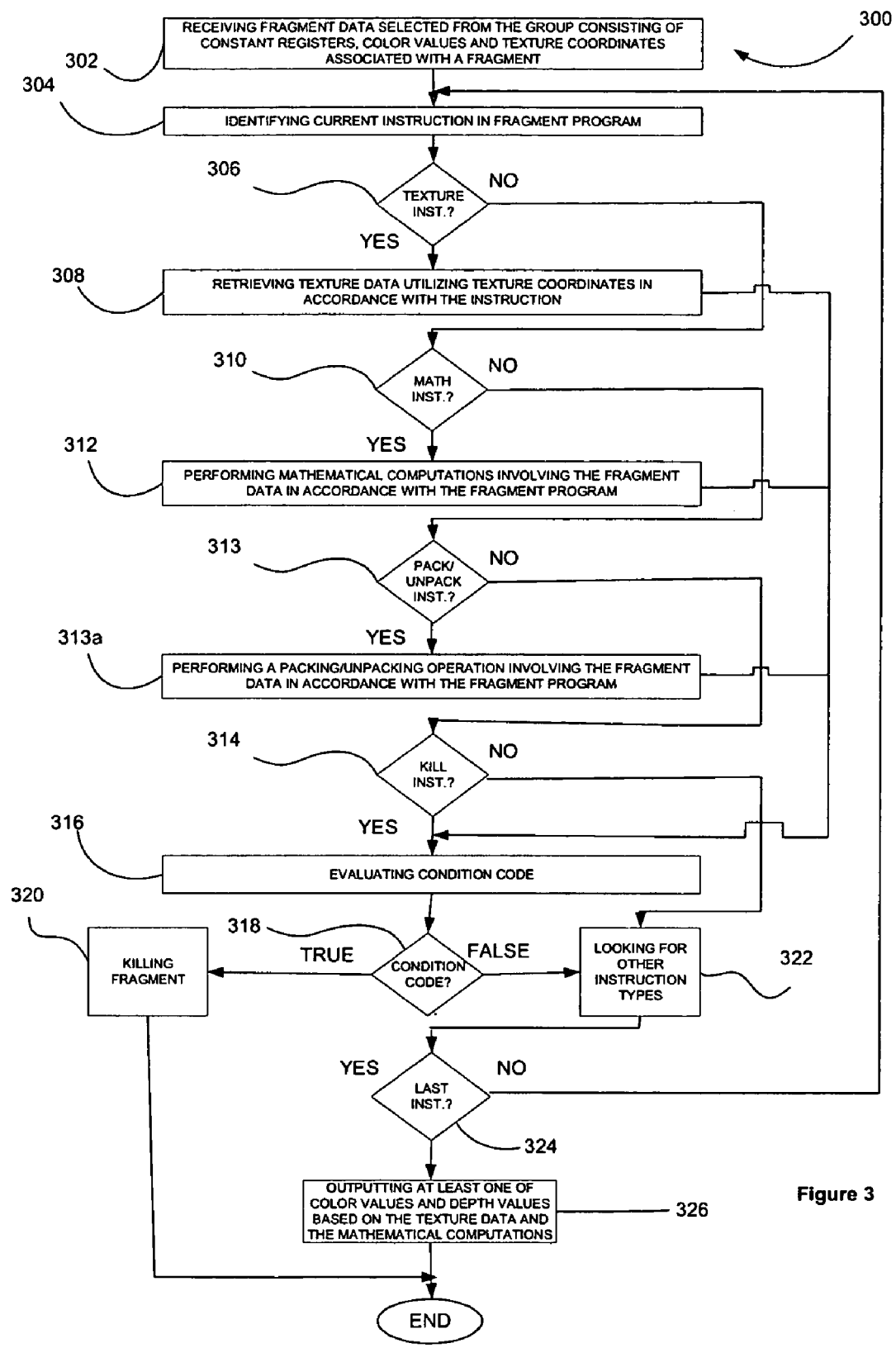
FIG. 3 illustrates a method for programmable processing of fragment data in a computer graphics pipeline, in accordance with operation 204 of FIG. 2.

An exemplary method in which operation 204 is executed will be set forth in greater detail during reference to FIG. 3.

If, on the other hand, it is determined in decision 202 that the graphics pipeline is not operating in the programmable mode, standard graphics application program interface (API) operations are performed on the fragment data in order to generate output. Note operation 206.

As an option, the standard graphics application program interface may include OpenGL® or any other desired graphics application program interface. Further, the standard graphics application program interface operations may be selected from the group consisting of texturing operations, color sum operations, fog operations, among others.

FIG. 3 illustrates a method 300 for programmable processing of fragment data in a computer graphics pipeline, in accordance with operation 204 of FIG. 2. It should be noted, however, that the present method 300 may be carried out independent of the method 200 of FIG. 2.

As shown, fragment data is received which is selected from the group consisting of constant registers, color values and texture coordinates associated with a fragment. Note operation 302. Next, a current instruction of a fragment program is identified in operation 304. This may be accomplished utilizing a pointer or the like.

Subsequently, it is determined in decision 306 as to whether the identified instruction is a texture instruction. If so, texture data is retrieved utilizing texture coordinates in accordance with the fragment program. See operation 308. Thereafter, a condition code is evaluated, as will be set forth in greater detail during reference to operation 316.

In a similar manner, it is determined in decision 310 as to whether the identified instruction is a mathematical instruction. If so, mathematical computations are performed involving the fragment data in accordance with the fragment program, as indicated in operation 312. Thereafter, a condition code is evaluated, as will be set forth in greater detail during reference to operation 316.

Similarly, it is, determined in decision 313 as to whether the identified instruction is a packing or unpacking instruction. If so, a packing or unpacking operation is performed involving the fragment data in accordance with the fragment program, as indicated in operation 313a. Thereafter, a condition code is evaluated, as will be set forth in greater detail during reference to operation 316.

Next, it is determined in decision 314 as to whether the identified instruction is a kill instruction. If so, a condition code is evaluated in operation 316. More information regarding such condition code will be set forth hereinafter in greater detail. If the condition code is evaluated to be TRUE, the fragment is killed and the program is terminated. Note operation 320. If, however, the condition code is evaluated to be FALSE, other "special" instruction types are searched and executed. Note operation 322.

It is then determined in decision 324 as to whether the current instruction is the last instruction of the fragment program. If not, the various operations are repeated using the next instruction. If so, however, at least one of color values and depth values are outputted based on the texture data, the mathematical computations, etc. Note operation 326. It should be noted that the floating-point color values outputted may actually have nothing to do with color, per-se. They could be, for example, normals (for future lighting operations), distances, or any other number of quantities.

The present technique may, in one embodiment, take the form of an extension that provides a mechanism for defining fragment program instruction sequences for application-defined fragment programs. When in a fragment program mode, a fragment program may be executed each time a fragment is produced by rasterization. The inputs for the program may be a set of constant registers and the attributes (e.g. colors, texture coordinates) associated with the fragment. Further, a fragment program may perform texture lookups using arbitrary texture coordinates and mathematical computations. The results of a fragment program are new color and depth values for the fragment. Again, it should be noted that the floating-point color values outputted may actually have nothing to do with color, per-se. They could be, for example, normals (for future lighting operations), distances, or any other number of quantities.

The present fragment program execution environment may be designed for efficient hardware implementation and to support a wide variety of programs. By design, the existing operations defined by existing OpenGL® per-fragment computation extensions can be implemented using the present model.

More information regarding programmable fragment processing may be found by reference to a co-pending application entitled "SYSTEM, METHOD AND COMPUTER PROGRAM PRODUCT FOR PROGRAMMABLE FRAGMENT PROCESSING IN A GRAPHICS PIPELINE" filed concurrently herewith by the same inventors under application Ser. No. 10/000,996, and which is incorporated herein by reference in its entirety.

Figure 4:
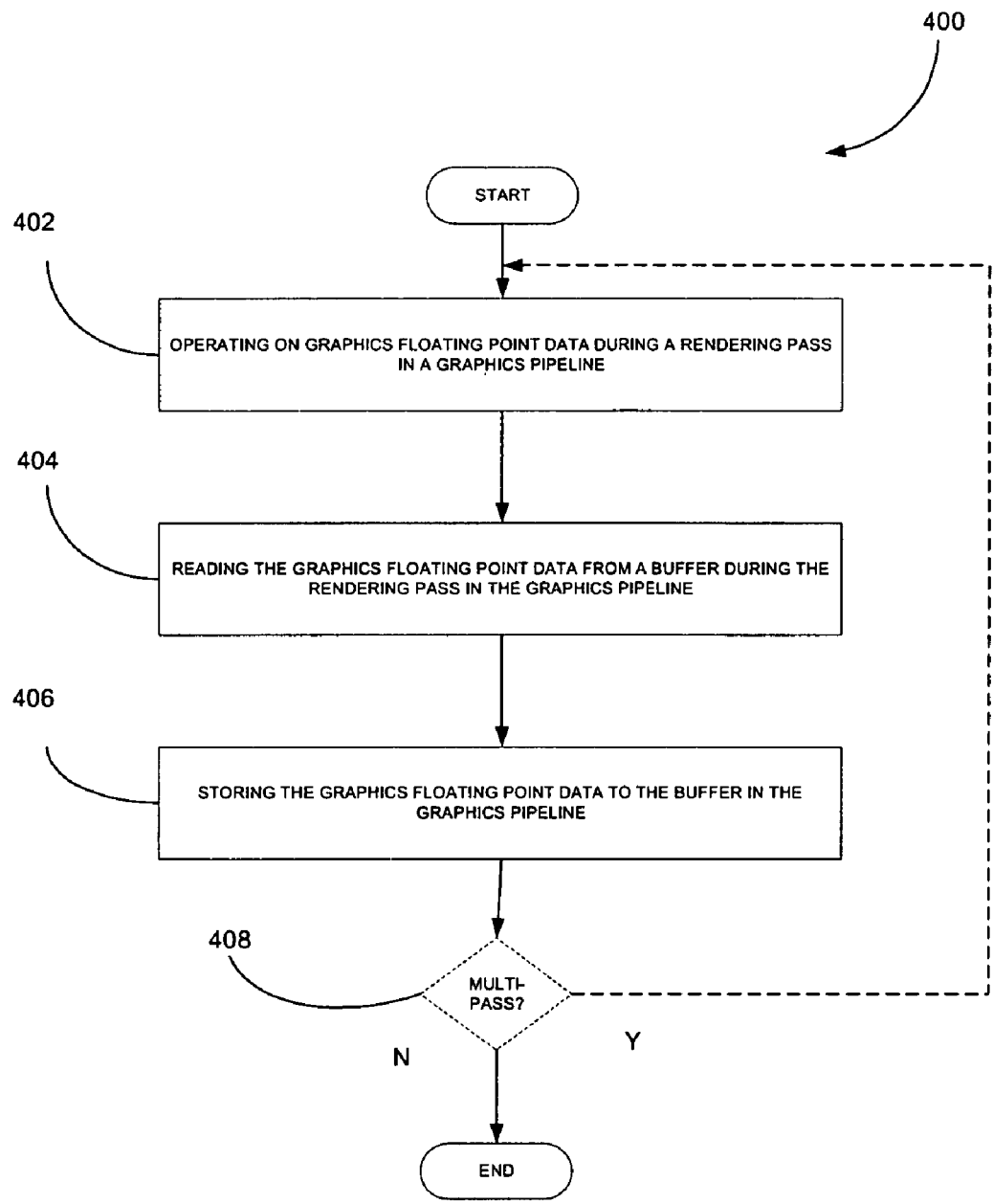
FIG. 4 illustrates a method for buffering data in a computer graphics pipeline.

FIG. 4 illustrates a method 400 for buffering data in a computer graphics pipeline. Such method 400 may be carried out in the form of an extension or integral component of any desired application program interface. Of course, the present technique may be implemented in any desired manner in an architecture such as that shown in FIG. 1 or in any other desired context.

Further, the present embodiment may optionally build upon the foregoing fragment programmability to provide a framebuffer and texture format that allows fragment programs to read and write unconstrained floating point data. Of course, it should be noted that the present embodiment may be employed in any desired environmental context. For example, this technique may be carried out in any desired graphics sub-system.

Initially, in operation 402, graphics floating point data are operated upon in a graphics pipeline. Such operations may include texturing operations, color sum operations, fog operations, or any other operation that contributes to or facilitates graphics processing. Such operations may or may not be associated with the aforementioned fragment program.

During such operation 404, graphics floating point data may be produced. This may be accomplished by reading the same from a buffer (e.g. texture maps) in a graphics pipeline, generating the same with a rasterizer, or any other desired method. It should be noted that an order of operations 402 and 404 may be interchangeable, as with the remaining operations.

As an option, the graphics floating point data may include fragment data, color data, depth data, etc. Such fragment data may be received from a rasterizer or any other desired source. Of course, the graphics floating point data may include any data in the graphics pipeline that is in a floating point form. Further, some of such data may be fixed-point data that is optionally converted to floating-point. For example, interpolated RGBA colors (e.g., f[COL0] in fragment programs) may be initially generated as fixed-point data.

Next, the graphics floating point data is stored to the buffer in the graphics pipeline. See operation 406.

In one embodiment, the graphics floating point data may be read and stored in an unclamped format for increasing a parameter selected from the group consisting of a precision and a range of the graphics floating point data. Further, the graphics floating point data may be only constrained by an underlying data type.

In another embodiment, the buffer may serve as a texture map. More details regarding such use will be set forth hereinafter in greater detail.

As an option, the method 400 may be used in the context of multi-pass rendering in a computer graphics pipeline. See decision 408. During use, the foregoing operations 402–406 may be repeated during additional rendering passes per the desires of the user. More information on such embodiment will be set forth hereinafter in greater detail.

For more information on multi-pass rendering, reference may be made to a patent application entitled "SYSTEM, METHOD AND ARTICLE OF MANUFACTURE FOR SHADOW MAPPING" which was filed Dec. 5, 2000 under Ser. No. 09/730,639, and which is incorporated herein by reference.

As an option, the operating may include deferred shading. More information on such embodiment will be set forth hereinafter in greater detail.

The present embodiment may thus provide a general computational model that supports floating-point numbers constrained only by the precision of the underlying data types.

To enhance the extended range and precision available through fragment programs, the present embodiment provides floating-point RGBA color buffers to replace conventional fixed-point RGBA color buffers. It should be noted that the floating-point RGBA color buffers can (and often will) be used to store non-color data. A floating-point RGBA color buffer consists of one to four floating-point components stored in the 16- or 32-bit floating-point formats (fp16 or fp32) which may be defined by a fragment program such as NV_fragment_program. Of course, formats other than 16- and 32-bit floating point are clearly possible.

A floating-point color buffer can replace the conventional fixed-point color buffer. In this case, the results of fragment programs, written to the "x", "y", "z", and "w" components of COLR/COLH output registers, may written directly to the color buffer without any scaling, clamping, or other modification. Certain per-fragment operations may be bypassed when rendering to floating-point color buffers.

A floating-point color buffer can also be used as a texture map, either by using conventional TexImage calls or by using previous rendering results via an extension such as the ARB_render_texture extension.

The present embodiment has many uses. Some exemplary possible uses will now be set forth.

(1) Multi-pass algorithms with arbitrary intermediate results that don't have to be artificially forced to the range [0,1]. In addition, intermediate results can be accumulated without having to worry about [0,1] clamping.

(2) Deferred shading algorithms where an expensive fragment program is executed only after depth testing is fully complete. Instead, a simple program is executed, which stores the parameters necessary to produce a final result. After the entire scene is rendered, a second pass is executed over the entire frame buffer to execute the complex fragment program using the results written to the floating-point color buffer in the first pass. This may save the cost of executing complex fragment programs on fragments that may not necessarily appear in the final image.

(3) Use of texture maps to evaluate functions with arbitrary ranges. Arbitrary continuous functions with a bounded domain could be approximated using a texture map holding sample results and piecewise linear interpolation.

More information will now be set forth regarding an exemplary embodiment of the foregoing technique. The following description should be reviewed for illustrative purposes only, and should not be construed as limiting in any manner. The foregoing principles may be applied in any desired extension and in any desired context.

The following description is set forth in the context of OpenGL® which is commonly known to those of ordinary skill. More particularly, the following information is set forth in the context of the OpenGL® Specification Version 1.3, which is incorporated herein by reference in its entirety. It should be noted that, in the present description, OpenGL® API commands and tokens are prefixed by "gl" and "GL_," respectively. Also, OpenGL® extension commands and tokens for extensions provided by NVIDIA® Corporation are, by convention, suffixed by "NV" or "_NV," respectively. When the context is clear, such prefixes and suffixes are dropped for brevity and clarity.

Various exemplary tokens associated with the present embodiment will now be set forth in Table #1E.

TABLE #1E

Accepted by the <internalformat> parameter of TexImage3D, TexImage2D,
   TexImage1D, CopyTexImage2D, and CopyTexImage1D:

| | |
|---|---|
| FLOAT_R_NV | 0x8880 |
| FLOAT_RG_NV | 0x8881 |
| FLOAT_RGB_NV | 0x8882 |
| FLOAT_RGBA_NV | 0x8883 |
| FLOAT_R16_NV | 0x8884 |
| FLOAT_R32_NV | 0x8885 |
| FLOAT_RG16_NV | 0x8886 |
| FLOAT_RG32_NV | 0x8887 |
| FLOAT_RGB16_NV | 0x8888 |
| FLOAT_RGB32_NV | 0x8889 |
| FLOAT_RGBA16_NV | 0x888A |
| FLOAT_RGBA32_NV | 0x888B |

Accepted by the <pname> parameter of GetBooleanv, GetIntegerv, GetFloatv,
   and GetDoublev:

| | |
|---|---|
| TEXTURE_FLOAT_COMPONENTS_NV | 0x888C |
| FLOAT_CLEAR_COLOR_VALUE_NV | 0x888D |
| FLOAT_RGBA_MODE_NV | 0x888E |

Accepted in the <piAttributes> array of wglGetPixelFormatAttribivARB and
   wglGetPixelFormatAttribfvARB and in the <piAttribIList> and
   <pfAttribFList> arrays of wglChoosePixelFormatARB:

| | |
|---|---|
| WGL_FLOAT_COMPONENTS_NV | 0x63F0 |
| WGL_BIND_TO_TEXTURE_RECTANGLE_FLOAT_R_NV | 0x63F1 |
| WGL_BIND_TO_TEXTURE_RECTANGLE_FLOAT_RG_NV | 0x63F2 |
| WGL_BIND_TO_TEXTURE_RECTANGLE_FLOAT_RGB_NV | 0x63F3 |
| WGL_BIND_TO_TEXTURE_RECTANGLE_FLOAT_RGBA_NV | 0x63F4 |
| WGL_TEXTURE_FLOAT_R_NV | 0x63F5 |
| WGL_TEXTURE_FLOAT_RG_NV | 0x63F6 |
| WGL_TEXTURE_FLOAT_RGB_NV | 0x63F7 |
| WGL_TEXTURE_FLOAT_RGBA_NV | 0x63F8 |

Final Conversion of DrawPixels Data

For RGBA components, if the destination of the operation is a fixed-point color buffer, each element is clamped to [0,1] and the resulting values are converted to fixed-point in a well known manner. Otherwise, elements are not necessarily modified. More information on this topic, as it pertains to fixed-point color buffers, that is well known to those of ordinary skill may be found in section 3.6.4 of the OpenGL 1.3 Specification.

Texture Image Specification

The selected groups are processed exactly as for DrawPixels stopping just before final conversion. For textures with fixed-point RGBA internal formats, each R, G, B, A component is clamped to [0,1].

Components are selected from the resulting pixel groups to obtain a texture with the base internal format specified by (or derived from) <internalformat>. Table #2 summarizes the mapping of pixel group values to texture components.

Specifying a value of <format> incompatible with <internalformat> produces the error INVALID_OPERATION. A pixel format and texture internal format are compatible if the pixel format can generate a pixel group of the type listed in the "Pixel Group Type" column of Table #2 in the row corresponding to the base internal format.

Textures with a base internal format of FLOAT_R_NV, FLOAT_RG_NV, FLOAT_RGB_NV, and FLOAT_RGBA_NV are known as floating-point textures. Such textures take the form of RGBA floating-point data, but the data contained may not have anything to do with color. In one embodiment, floating point textures may be supported only for the TEXTURE_RECTANGLE_NV target. Specifying an floating-point texture with any other target may produce an INVALID_OPERATION error.

TABLE 2

| Base Internal Format | Pixel Group Type | Component Values | Internal Components |
|---|---|---|---|
| ALPHA | RGBA | A | A |
| LUMINANCE | RGBA | R | L |
| LUMINANCE_ALPHA | RGBA | R,A | L,A |
| INTENSITY | RGBA | R | I |
| RGB | RGBA | R,G,B | R,G,B |
| RGBA | RGBA | R,G,B,A | R,G,B,A |
| *COLOR_INDEX | CI | CI | CI |
| *DEPTH_COMPONENT | DEPTH | DEPTH | DEPTH |
| *HILO_NV | HILO | HI,LO | HI,LO |
| *DSDT_NV | TEXOFF | DS,DT | DS,DT |
| *DSDT_MAG_NV | TEXOFF | DS,DT,MAG | DS,DT,MAG |
| *DSDT_MAG_INTENSITY_NV | TEXOFF or RGBA | DS,DT, MAG,VIB | DS,DT,MAG,I |
| FLOAT_R_NV | RGBA | R | R (float) |
| FLOAT_RG_NV | RGBA | R,G | R,G (float) |
| FLOAT_RGB_NV | RGBA | R,G,B | R,G,B (float) |
| FLOAT_RGBA_NV | RGBA | R,G,B,A | R,G,B,A (float) |

Conversion from pixel groups to internal texture components. "Pixel Group Type" defines the type of pixel group required for the specified internal format. All internal components are stored as unsigned-fixed point numbers, except for DS/DT (signed fixed-point numbers) and floating-point R,G,B,A (signed floating-point numbers). Texture components → R, G, B, A, L, and I. Texture components → HI, LO, DS, DT, and MAG. *indicates formats found in other extension specs: COLOR_INDEX in EXT_paletted texture; DEPTH_COMPONENT in SGIX_depth_texture; and HILO_NV, DSDT_NV, DSDT_MAG_NV, DSDT_MAG_INTENSITY_NV in NV_texture_shader.

It should be noted that this table may be respecfied with any extensions relevant to texture formats supported by a particular environment. For example, four base internal formats may be added.

The internal component resolution is the number of bits allocated to each component in a texture image. If internal format is specified as a base internal format (as listed in Table #2), the GL stores the resulting texture with internal component resolutions of its own choosing. If a sized internal format is specified, the memory allocation per texture component is assigned by the GL to match the allocations listed in Table #3 as closely as possible.

TABLE 3

| Sized Int. Format | Base Int. Format | Component Name/Type-Size |
|---|---|---|
| ALPHA4 | ALPHA | A/U4 |
| ALPHA8 | ALPHA | A/U8 |
| ALPHA12 | ALPHA | A/U12 |
| ALPHA16 | ALPHA | A/U16 |
| LUMINANCE4 | LUMINANCE | L/U4 |
| LUMINANCE8 | LUMINANCE | L/U8 |
| LUMINANCE12 | LUMINANCE | L/U12 |
| LUMINANCE16 | LUMINANCE | L/U16 |
| LUMINANCE4_ALPHA4 | LUMINANCE_ALPHA | A/U4 L/U4 |
| LUMINANCE6_ALPHA2 | LUMINANCE_ALPHA | A/U2 L/U6 |
| LUMINANCE8_ALPHA8 | LUMINANCE_ALPHA | A/U8 L/U8 |
| LUMINANCE12_ALPHA4 | LUMINANCE_ALPHA | A/U4 L/U12 |
| LUMINANCE12_ALPHA12 | LUMINANCE_ALPHA | A/U12 L/U12 |
| LUMINANCE16_ALPHA16 | LUMINANCE_ALPHA | A/U16 L/U16 |
| INTENSITY4 | INTENSITY | I/U4 |
| INTENSITY8 | INTENSITY | I/U8 |
| INTENSITY12 | INTENSITY | I/U12 |
| INTENSITY16 | INTENSITY | 1/U16 |
| R3_G3_B2 | RGB | R/U3 G/U3 B/U2 |
| RGB4 | RGB | R/U4 G/U4 B/U4 |
| RGB5 | RGB | R/U5 G/U5 B/U5 |
| RGB8 | RGB | R/U8 G/U8 B/U8 |
| RGB10 | RGB | R/U10 G/U10 B/10 |
| RGB12 | RGB | R/U12 G/U12 B/U12 |
| RGB16 | RGB | R/U16 G/U16 B/U16 |
| RGBA2 | RGBA | R/U2 G/U2 B/U2 A/U2 |
| RGBA4 | RGBA | R/U4 G/U4 B/U4 A/U4 |
| RGB5_A1 | RGBA | R/U5 G/U5 B/U5 A/U1 |
| RGBA8 | RGBA | R/U8 G/U8 B/U8 A/U8 |
| RGB10_A2 | RGBA | R/U10 G/U10 B/U10 A/U2 |
| RGBA12 | RGBA | R/U12 G/U12 B/U12 A/U12 |
| RGBA16 | RGBA | R/U16 G/U16 B/U16 A/U16 |
| *COLOR_INDEX1_EXT | COLOR_INDEX | CI/U1 |
| *COLOR_INDEX2_EXT | COLOR_INDEX | CI/U2 |
| *COLOR_INDEX4_EXT | COLOR_INDEX | CI/U4 |
| *COLOR_INDEX8_EXT | COLOR_INDEX | CI/U8 |
| *COLOR_INDEX16_EXT | COLOR_INDEX | CI/U16 |
| *DEPTH_COMPONENT16_SGIX | DEPTH_COMPONENT | Z/U16 |
| *DEPTH_COMPONENT24_SGIX | DEPTH_COMPONENT | Z/U24 |
| *DEPTH_COMPONENT32_SGIX | DEPTH_COMPONENT | Z/U32 |
| *HILO16_NV | HILO | HI/U16 LO/U16 |
| *SIGNED_HILO16_NV | HILO | HI/S16 LO/S16 |
| *SIGNED_RGBA8_NV | RGBA | R/S8 G/S8 B/S8 A/S8 |
| *SIGNED_RGB8_UNSIGNED_ALPHA8_NV | RGBA | R/S8 G/S8 B/S8 A/U8 |
| *SIGNED_RGB8_NV | RGB | R/S8 G/S8 B/S8 |
| *SIGNED_LUMINANCE8_NV | LUMINANCE | L/S8 |
| *SIGNED_LUMINANCE8_ALPHA8_NV | LUMINANCE_ALPHA | L/S8 A/S8 |
| *SIGNED_ALPHA8_NV | ALPHA | A/S8 |
| *SIGNED_INTENSITY8_NV | INTENSITY | I/S8 |
| *DSDT8_NV | DSDT_NV | DS/S8 DT/S8 |
| *DSDT8_MAG8_NV | DSDT_MAG_NV | DS/S8 DT/S8 MAG/U8 |
| *DSDT8_MAG8_INTENSITY8_NV | DSDT_MAG_INTENSITY_NV | DS/S8 DT/S8 MAG/U8 I/U8 |
| FLOAT_R16_NV | FLOAT_R_NV | R/F16 |
| FLOAT_R32_NV | FLOAT_R_NV | R/F32 |
| FLOAT_RG16_NV | FLOAT_RG_NV | R/F16 G/F16 |
| FLOAT_RG32_NV | FLOAT_RG_NV | R/F32 G/F32 |
| FLOAT_RGB16_NV | FLOAT_RGB_NV | R/F16 G/F16 B/F16 |
| FLOAT_RGB32_NV | FLOAT_RGB_NV | R/F32 G/F32 B/F32 |
| FLOAT_RGBA16_NV | FLOAT_RGBA_NV | R/F16 G/F16 B/F16 A/F16 |
| FLOAT_RGBA32_NV | FLOAT_RGBA_NV | R/F32 G/F32 B/F32 A/F32 |

Sized Internal Formats. Describes the correspondence of sized internal formats to base internal formats, and desired component resolutions. Component resolution descriptions are of the form "<NAME>/<TYPE><SIZE>", where NAME specifies the component name in Table #2, TYPE is "U" for unsigned fixed-point, "S" for signed fixed-point, and "F" for unsigned floating-point. <SIZE> is the number of requested bits per component.
*indicates formats found in other extension specs: COLOR_INDEX in EXT_paletted texture; DEPTH_COMPONENT in SGIX_depth_texture; and HILO_NV, DSDT_NV, DSDT_MAG_NV, DSDT_MAG_INTENSITY_NV in NV_texture_shader.

It should be noted that this table may be respecfied with any extensions relevant to sized texture internal formats supported by a particular environment. For example, eight sized internal formats may be added. More information on this topic that is well known to those of ordinary skill may be found in section 3.8.1 of the OpenGL 1.3 Specification and the extension specifications for the extensions listed above.

Texture Minification

Floating-point textures (those with a base internal format of FLOAT_R_NV, FLOAT_RG_NV, FLOAT_RGB_NV, or FLOAT_RGBA_NV) do not necessarily support texture filters other than NEAREST. For such textures, NEAREST filtering is applied regardless of the setting of TEXTURE_MIN_FILTER. More information on this topic that is well known to those of ordinary skill may be found in section 3.8.7 of the OpenGL 1.3 Specification.

Texture Magnification

Floating-point textures (those with a base internal format of FLOAT_R_NV, FLOAT_RG_NV, FLOAT_RGB_NV, or FLOAT_RGBA_NV) do not necessarily support texture filters other than NEAREST. For such textures, NEAREST filtering is applied regardless of the setting of TEXTURE_MAG_FILTER. More information on this topic that is well known to those of ordinary skill may be found in section 3.8.8 of the OpenGL 1.3 Specification.

Texture Environments and Texture Functions

If the base internal format is HILO_NV, DSDT_NV, DSDT_MAG_NV, DSDT_MAG_INTENSITY_NV, FLOAT_R_NV, FLOAT_RG_NV, FLOAT_RGB_NV, or FLOAT_RGBA_NV, means to combine texture lookup results with the current fragment color are not necessarily supported using conventional OpenGL texture functions. In one embodiment where such textures are unsupported, the corresponding texture function is NONE (Cv=Cf, Av=Af), and it is as though texture mapping were disabled for that texture unit. It may even be possible to define useful conventional behavior. More information on this topic that is well known to those of ordinary skill may be found in section 3.8.13 of the OpenGL 1.3 Specification.

Antialiasing Application

If antialiasing is enabled for the primitive from which a rasterized fragment was produced, then the computed coverage value may be applied to the fragment. In RGBA mode with fixed-point frame buffers, the value is multiplied by the fragment's alpha (A) value to yield a final alpha value. In RGBA mode with floating-point frame buffers, the coverage value may simply be discarded in some embodiments. In color index mode, the value is used to set the low order bits of the color index value. More information on this topic that is well known to those of ordinary skill may be found in section 3.11 of the OpenGL 1.3 Specification.

Per-Fragment Operations and the Frame Buffer

The GL provides three types of color buffers: color index, fixed-point RGBA, or floating-point RGBA. Color index buffers consist of unsigned integer color indices. Fixed-point RGBA buffers consist of R, G, B, and optionally, A unsigned integer values. Floating-point RGBA buffers consist of R, and optionally, G, B, and A floating-point component values, which may correspond to the X, Y, Z, and W outputs, respectively, of a fragment program. The number of bit-planes in each of the color buffers, the depth buffer, the stencil buffer, and the accumulation buffer is fixed and window dependent. If an accumulation buffer is provided, it may have at least as many bitplanes per R, G, and B color component as do the color buffers. More information on this topic that is well known to those of ordinary skill may be found in Chapter 4 of the OpenGL 1.3 Specification.

Multisample Fragment Operations

Optionally, this step applies only for fixed-point RGBA color buffers. Otherwise, proceed to the next step. More information on this topic that is well known to those of ordinary skill may be found in section 4.1.3 of the OpenGL 1.3 Specification. Of course, the present step may optionally be applied to floating-point RGBA color buffers.

Alpha Test

This step applies only for fixed-point RGBA color buffers. Otherwise, proceed to the next step. More information on this topic that is well known to those of ordinary skill may be found in section 4.1.4 of the OpenGL 1.3 Specification. Of course, the present step may optionally be applied to floating-point RGBA color buffers.

Blending

Blending combines the incoming fragment's R, G, B, and A values with the R, G, B, and A values stored in the framebuffer at the incoming fragment's (xw; yw) location. This blending is dependent on the incoming fragment's alpha value and that of the corresponding currently stored pixel. Blending applies only for fixed-point RGBA color buffers; otherwise, it is bypassed. More information on this topic that is well known to those of ordinary skill may be found in section 4.1.7 of the OpenGL 1.3 Specification. Of course, the present step may optionally be applied to floating-point RGBA color buffers.

Dithering

Dithering selects between two color values or indices. Dithering does not necessarily apply to floating-point RGBA color buffers. More information on this topic that is well known to those of ordinary skill may be found in section 4.1.8 of the OpenGL 1.3 Specification.

Logical Operation

A logical operation is applied between the incoming fragment's color or index values and the color or index values stored at the corresponding location in the frame buffer. Logical operations do not necessarily apply to floating-point color buffers. More information on this topic that is well known to those of ordinary skill may be found in section 4.1.9 of the OpenGL 1.3 Specification.

Additional Multisample Fragment Operations

For fixed-point RGBA color buffers, after all operations have been completed on the multisample buffer. For floating-point RGBA color buffers, the color buffer is not necessarily modified. More information on this topic that is well known to those of ordinary skill may be found in section 4.1.10 of the OpenGL 1.3 Specification.

Clearing the Buffers

The GL provides a means for setting portions of every pixel in a particular buffer to the same value. The argument to void ClearColor(float r, float g, float b, float a);

sets the clear value for RGBA color buffers. When a fixed-point color buffer is cleared, the effective clear color is derived by clamping each component to [0,1] and converting to fixed-point according to the rules well known to those of ordinary skill. When a floating-point color buffer is cleared, the components of the clear value are used directly without being clamped. More information on this topic that is well known to those of ordinary skill may be found in section 4.2.3 of the OpenGL 1.3 Specification.

The Accumulation Buffer

If there is no accumulation buffer, or if color buffer is not fixed-point RGBA, Accum may generate the error INVALID_OPERATION. More information on this topic that is well known to those of ordinary skill may be found in section 4.2.4 of the OpenGL 1.3 Specification.

Reading Pixels/Conversion of RGBA Values

This step applies only if the GL is in RGBA mode, and then only if format is neither STENCIL INDEX nor DEPTH COMPONENT. The R, G, B, and A values form a group of elements. If the color buffer has fixed-point format, each element is taken to be a fixed-point value in [0,1] with m bits, where m is the number of bits in the corresponding color component of the selected buffer. More information on this topic that is well known to those of ordinary skill may be found in section 4.3.2 of the OpenGL 1.3 Specification.

Final Conversion of ReadPixels Data

For an RGBA color, components are clamped depending on the data type of the buffer being read. For fixed-point buffers, each component is clamped to [0.1]. For floating-point buffers, if <type> is not FLOAT or HALF_FLOAT_NV, each component is clamped to [0,1] if <type> is unsigned or [−1,1] if <type> is signed and then converted. More information on this topic that is well known to those of ordinary skill may be found in section 4.3.2 of the OpenGL 1.3 Specification.

Texture Queries

Table #4 illustrates texture, table, and filter return values. Ri, Gi, Bi, Ai, Li, and Ii are components of the internal format that are assigned to pixel values R, G, B, and A. If a requested pixel value is not present in the internal format, the specified constant value is used. More information on this topic that is well known to those of ordinary skill may be found in section 6.1.4 of the OpenGL 1.3 Specification.

TABLE #4

| Base Internal Format | R | G | B | A |
| --- | --- | --- | --- | --- |
| FLOAT_R_NV | R | 0 | 0 | 0 |
| FLOAT_RG_NV | R | G | 0 | 0 |
| FLOAT_RGB_NV | R | G | B | 0 |
| FLOAT_RGBA_NV | R | G | B | A |

WGL Subsystem

Table #5 illustrates possible modifications to WGL (OpenGL on Microsoft Windows®) subsystem, as extended by the ARB_pixel_format and ARB_render_texture extensions, to accommodate the present invention.

TABLE #5

Modify/add to the description of <piAttributes> in wglGetPixelFormatAttribivARB and <pfAttributes> in wglGetPixelFormatAttribfvARB:
  WGL_FLOAT_COMPONENTS_NV
    True if the R, G, B, and A components of each color buffer are
    represented as (unclamped) floating-point numbers.
  WGL_BIND_TO_TEXTURE_RECTANGLE_FLOAT_R_NV
  WGL_BIND_TO_TEXTURE_RECTANGLE_FLOAT_RG_NV
  WGL_BIND_TO_TEXTURE_RECTANGLE_FLOAT_RGB_NV
  WGL_BIND_TO_TEXTURE_RECTANGLE_FLOAT_RGBA_NV
    True if the pixel format describes a floating-point color that can be
    bound to a texture rectangle with internal formats of FLOAT_R_NV,
    FLOAT_RG_NV, FLOAT_RGB_NV, or FLOAT_RGBA_NV, respectively. Currently
    only pbuffers can be bound as textures so this attribute may only be
    TRUE if WGL_DRAW_TO_PBUFFER is also TRUE. Additionally,
    floating-point color buffers can not necessarily be bound to texture targets
    other than TEXTURE_RECTANGLE_NV.
Add new table entries for pixel format attribute matching in wglChoosePixelFormatARB.

| Attribute | Type | Match Criteria |
| --- | --- | --- |
| WGL_FLOAT_COMPONENTS_NV | boolean | exact |
| WGL_BIND_TO_TEXTURE_RECTANGLE_FLOAT_R_NV | boolean | exact |
| WGL_BIND_TO_TEXTURE_RECTANGLE_FLOAT_RG_NV | boolean | exact |
| WGL_BIND_TO_TEXTURE_RECTANGLE_FLOAT_RGB_NV | boolean | exact |
| WGL_BIND_TO_TEXTURE_RECTANGLE_FLOAT_RGBA_NV | boolean | exact |

(In the wglCreatePbufferARB section, modify the attribute list)
  WGL_TEXTURE_FORMAT_ARB
  This attribute indicates the base internal format of the texture that will be
  created when a color buffer of a pbuffer is bound to a texture map. It can
  be set to WGL_TEXTURE_RGB_ARB (indicating an internal format of RGB),
  WGL_TEXTURE_RGBA_ARB (indicating a base internal format of RGBA),
  WGL_TEXTURE_FLOAT_R_NV (indicating a base internal format of FLOAT_R_NV),
  WGL_TEXTURE_FLOAT_RG_NV (indicating a base internal format of FLOAT_RG_NV),
  WGL_TEXTURE_FLOAT_RGB_NV (indicating a base internal format of FLOAT_RGB_NV),
  WGL_TEXTURE_FLOAT_RGBA_NV (indicating a base internal format of
  FLOAT_RGBA_NV), orWGL_NO_TEXTURE_ARB. The default value is
  WGL_NO_TEXTURE_ARB.
(In the wglCreatePbufferARB section, modify the discussion of what happens to the depth/stencil/accum buffers when switching between mipmap levels or cube map faces.)
  For pbuffers with a texture format of WGL_TEXTURE_RGB_ARB,
  WGL_TEXTURE_RGBA_ARB, WGL_TEXTURE_FLOAT_R_NV, WGL_TEXTURE_FLOAT_RG_NV,
  WGL_TEXTURE_FLOAT_RGB_NV, or WGL_TEXTURE_FLOAT_RGBA_NV, there will be a
  separate set of color buffers for each mipmap level and cube map face in the
  pbuffer. Otherwise, the WGL implementation is free to share a single set of
  color, auxillary, and accumulation buffers between levels or faces.
For pbuffers with a texture format of WGL_TEXTURE_DEPTH_COMPONENT_NV,
there may be a separate depth buffer for each mipmap level and cube map
face. However, any stencil, accumulation, and color buffers may be shared

TABLE #5-continued between levels or faces. Therefore, the contents of the stencil,
accumulation, and color buffers are undefined after switching between
mipmap levels or cube map faces.
(In the wglCreatePbufferARB section, modify the error list)

| | | |
|---|---|---|
| ERROR_INVALID_DATA | WGL_TEXTURE_FORMAT_ARB is WGL_TEXTURE_FLOAT_R_NV, WGL_TEXTURE_FLOAT_RG_NV, WGL_TEXTURE_FLOAT_RGB_NV, or WGL_TEXTURE_FLOAT_RGBA_NV, and WGL_TEXTURE_TARGET_ARB is not WGL_TEXTURE_RECTANGLE_NV. | |
| ERROR_INVALID_DATA | WGL_TEXTURE_FORMAT_ARB is WGL_TEXTURE_FLOAT_R_NV, WGL_TEXTURE_TARGET_ARB is WGL_TEXTURE_RECTANGLE_NV, and the WGL_BIND_TO_TEXTURE_RECTANGLE_FLOAT_R_NV attribute is not necessarily set in the pixel format. | |
| ERROR_INVALID_DATA | WGL_TEXTURE_FORMAT_ARB is WGL_TEXTURE_FLOAT_RG_NV, WGL_TEXTURE_TARGET_ARB is WGL_TEXTURE_RECTANGLE_NV, and the WGL_BIND_TO_TEXTURE_RECTANGLE_FLOAT_RG_NV attribute is not necessarily set in the pixel format. | |
| ERROR_INVALID_DATA | WGL_TEXTURE_FORMAT_ARB is WGL_TEXTURE_FLOAT_RGB_NV, WGL_TEXTURE_TARGET_ARB is WGL_TEXTURE_RECTANGLE_NV, and the WGL_BIND_TO_TEXTURE_RECTANGLE_FLOAT_RGB_NV attribute is not necessarily set in the pixel format. | |
| ERROR_INVALID_DATA | WGL_TEXTURE_FORMAT_ARB is WGL_TEXTURE_FLOAT_RGBA_NV, WGL_TEXTURE_TARGET_ARB is WGL_TEXTURE_RECTANGLE_NV, and the WGL_BIND_TO_TEXTURE_RECTANGLE_FLOAT_RGBA_NV attribute is not necessarily set in the pixel format. | |

Modify wglBindTexImageARB:
The pbuffer attribute WGL_TEXTURE_FORMAT_ARB determines the base
internal format of the texture. The format-specific component sizes
are also determined by pbuffer attributes as shown in the table below.
The component sizes are dependent on the format of the texture.

| Component | Size | Format |
|---|---|---|
| R | WGL_RED_BITS_ARB | RGB, RGBA, FLOAT_R, FLOAT_RG, FLOAT_RGB, FLOAT_RGBA |
| G | WGL_GREEN_BITS_ARB | RGB, RGBA, FLOAT_R, FLOAT_RG, FLOAT_RGB, FLOAT_RGBA |
| B | WGL_BLUE_BITS_ARB | RGB, RGBA, FLOAT_R, FLOAT_RG, FLOAT_RGB, FLOAT_RGBA |
| A | WGL_ALPHA_BITS_ARB | RGB, RGBA, FLOAT_R, FLOAT_RG, FLOAT_RGB, FLOAT_RGBA |
| D | WGL_DEPTH_BITS_ARB | DEPTH_COMPONENT |

Table #6 illustrates a plurality of errors that may be relevant in the context of the present embodiment.

TABLE #6

INVALID_OPERATION may be generated by Begin, DrawPixels, Bitmap, CopyPixels, or a command that performs an explicit Begin if the color buffer has a floating-point RGBA format and FRAGMENT_PROGRAM_NV is disabled.

INVALID_OPERATION is generated by TexImage3D, TexImage2D, TexImage1D, TexSubImage3D, TexSubImage2D, or TexSubImage1D if the pixel group type corresponding to <format> is not compatible with the base internal format of the texture.

INVALID_OPERATION may be generated by TexImage3D, TexImage1D, or CopyTexImage1D if the base internal format corresponding to <internalformat> is FLOAT_R_NV, FLOAT_RG_NV, FLOAT_RGB_NV, or FLOAT_RGBA_NV.

INVALID_OPERATION may be generated by TexImage2D or CopyTexImage2D if the base internal format corresponding to <internalformat> is FLOAT_R_NV, FLOAT_RG_NV, FLOAT_RGB_NV, or FLOAT_RGBA_NV and <target> is not TEXTURE_RECTANGLE_NV.

INVALID_OPERATION may be generated by Accum if the color buffer has a color index or floating-point RGBA format;

TABLE #6-continued

ERROR_INVALID_DATA may be generated by wglCreatePbufferARB if WGL_TEXTURE_FORMAT_ARB is WGL_TEXTURE_FLOAT_R_NV, GL_TEXTURE_FLOAT_RG_NV, WGL_TEXTURE_FLOAT_RGB_NV, or WGL_TEXTURE_FLOAT_RGBA_NV, and WGL_TEXTURE_TARGET_ARB is not WGL_TEXTURE_RECTANGLE_NV.

ERROR_INVALID_DATA is generated by wglCreatePbufferARB if WGL_TEXTURE_FORMAT_ARB is WGL_TEXTURE_FLOAT_R_NV, WGL_TEXTURE_TARGET_ARB is WGL_TEXTURE_RECTANGLE_NV, and the WGL_BIND_TO_TEXTURE_RECTANGLE_FLOAT_R_NV attribute is not set in the pixel format.

ERROR_INVALID_DATA is generated by wglCreatePbufferARB if WGL_TEXTURE_FORMAT_ARB is WGL_TEXTURE_FLOAT_RG_NV, WGL_TEXTURE_TARGET_ARB is WGL_TEXTURE_RECTANGLE_NV, and the WGL_BIND_TO_TEXTURE_RECTANGLE_FLOAT_RG_NV TABLE #6-continued attribute is not set in the pixel format.
 ERROR_INVALID_DATA is generated by wglCreatePbufferARB if
WGL_TEXTURE_FORMAT_ARB is
WGL_TEXTURE_FLOAT_RGB_NV,
GL_TEXTURE_TARGET_ARB is
WGL_TEXTURE_RECTANGLE_NV, and the
WGL_BIND_TO_TEXTURE_RECTANGLE_FLOAT_RGB_NV
attribute is not set in the pixel format.
 ERROR_INVALID_DATA is generated by wglCreatePbufferARB if
WGL_TEXTURE_FORMAT_ARB is
WGL_TEXTURE_FLOAT_RGBA_NV,
WGL_TEXTURE_TARGET_ARB is
WGL_TEXTURE_RECTANGLE_NV, and the
WGL_BIND_TO_TEXTURE_RECTANGLE_FLOAT_RGBA_NV
attribute is not set in the pixel format.

FIG. 5 illustrates new states 500 that may be relevant in the context of the present embodiment. More information on this that is well known to those of ordinary skill may be found in section 6.2 of the OpenGL 1.3 Specification.

Options and Issues

The extension could create a separate non-RGBA pixel formats or simply extend existing RGBA formats. Since fragment programs generally build on RGBA semantics, it's cleaner to avoid creating a separate "XYZW" mode. There are several special semantics that may be added: clear color state is now not clamped, and ReadPixels may clamp to [0,1] only if the source data comes from fixed-point color buffers.

It should be noted that fragment programs can be written that store data completely unrelated to color into a floating-point "RGBA" color buffer.

Floating-point color buffers may or may not be displayed. In one embodiment, floating-point color buffers can only be used as pbuffers (i.e. off-screen windows), to avoid the expense of building floating-point display engine logic.

Various things may happen when rendering to a floating-point color buffer if fragment program mode is disabled, or when fragment program mode is enabled, but no program is loaded. Fragment programs may be required to use floating-point color buffers. An INVALID_OPERATION error may be generated by any GL command that generates fragments if a fragment program extension such as FRAGMENT_PROGRAM_NV is disabled. The same behavior already exists in some embodiments for conventional frame buffers if FRAGMENT_PROGRAM_NV is enabled but the bound fragment program is invalid.

Alpha test may or may not be supported with floating-point color buffers. If not, it is trivial to implement an alpha test in a fragment program using a KIL instruction, which requires no dedicated frame buffer logic.

Blending may or may not be supported with floating-point color buffers. While blending would clearly be useful, full-precision floating-point blenders are expensive. In addition, a computational model more general than traditional blending (with its 1-x operations and clamping) is desirable. The traditional OpenGL blending model would not necessarily be the most suitable computational model for blend-enabled floating-point color buffers.

An alternative to conventional blending (operating at a coarser granularity) is to (1) render a pass into the color buffer, (2) bind the color buffer as a texture rectangle using this extension and ARB_render_texture, (3) perform texture lookups in a fragment program using the TEX instruction with f[WPOS].xy as a 2D texture coordinate, and (4) perform the necessary blending between the passes using the same fragment program.

Accumulation buffers may or may not be provided for pixel formats with floating-point color buffers. If not, accumulation operations can be achieved by using multiple color buffers with fragment programs to perform the accumulation, which requires no dedicated frame buffer logic.

Fragment program color results may or may not be converted to match the format of the frame buffer. Further, an error may or may not result. A situation of interest arises when one writes to o[COLR] but has a 16-bit floating-point frame buffer. Conversions can be performed simply in hardware, so no error semantics are required. This mechanism also allows the same programs to be shared between contexts with different pixel formats.

Applications may be aware that PK2/PK4 results are preserved only if written to an appropriate-sized frame buffer.

Floating-point color buffers may interact with multisampling in any desired manner. For normal color buffers, the multiple samples for each pixel may be required to be filtered down to a single color. Similar filtering on floating-point color buffers does not necessarily make sense. Further, there may or may not be a normal color buffer in this case. Floating-point buffers are specified to work with multisampling just like normal color buffers, except that no automatic resolution is performed. Still, this has its problems. For example, what would ReadPixels return? One option may be for an application to supersample (i.e., allocate a larger buffer) instead of multisample, but that has performance disadvantages. A second option may be to eat the memory and do a downsample if and only if necessary. A third option may be to specify "multisample-only" behavior.

Conventional RGBA antialiasing multiplies coverage by the alpha component of the fragment's color, with the assumption that alpha blending will be performed. Antialiasing may work with floating-point color buffers in various ways. It should be noted, however, that conventional anti-aliasing requires alpha blending, which may or may not work for floating-point color buffers.

The semantics for DrawPixels may vary when using an floating-point color buffer. DrawPixels generates fragments like any other primitive. For floating-point color buffers, the components of the associated color are not necessarily clamped to [0, 1], as with conventional frame buffers. This ensures that one can save and restore floating-point color buffers using ReadPixels/DrawPixels.

The semantics for ReadPixels may vary when using an floating-point color buffer. ReadPixels from a floating-point color buffer works like any other RGBA read, except that the final results are not necessarily clamped to the range [0, 1]. This ensures that one can save and restore floating-point color buffers using ReadPixels/DrawPixels.

The semantics for CopyPixels may vary when using an floating-point color buffer. CopyPixels requires no special semantics, as it is equivalent to a slightly abbreviated ReadPixels followed by a DrawPixels.

The semantics for Bitmap may also vary when using an floating-point color buffer. Bitmap generates fragments using the current raster attributes, which are then passed to fragment programs like any other fragments.

Still yet, the semantics for Clear may vary when using an floating-point color buffer. Clears work as normal, except for clamping. The core spec is modified so that clear color values are not necessarily clamped to [0, 1]. For fixed-point color buffers, clear colors are clamped to [0,1] at clear time.

For compatibility with conventional OpenGL, queries of CLEAR_COLOR_VALUE may clamp components to [0,1].

A separate FLOAT_CLEAR_COLOR NV query should be added to query unclamped color clear values.

Floating-point textures may or may not support filtering. Texture filtering may be achieved in various ways. Extended OpenGL texture filtering (including mipmapping and support for anisotropic filters) is very computationally expensive. Even simple linear filtering for floating-point textures with large components is expensive.

Linear filters can be implemented in fragment programs by doing multiple lookups into the same texture. Since fragment programs allow the use of arbitrary coordinates into arbitrary texture maps, this type of operation can be easily done.

A 1D linear filter can be implemented using an n×1 texture rectangle with the following (untested) fragment program, assuming the 1D coordinate is in f[TEX0].x. Note Table #7.

TABLE #7

```
ADDR H2.xy, f[TEX0].x, {0.0, 1.0};
FRCH H3.x, R1.x; # compute the blend factor
TEX H0, H2.x, TEX0, RECT;   # lookup 1st sample
TEX H1, H2.y, TEX0, RECT;   # lookup 2nd sample
LRPH H0, H3.x, H1, H0;       # blend
```

A 2D linear filter can be implemented similarly, assuming the 2D coordinate is in f[TEX0].xy. Note Table #8.

TABLE #8

```
ADDH H2, f[TEX0].xyxy, {0.0, 0.0, 1.0, 1.0};
FRCH H3.xy, H2.xyxy;              # base weights
ADDH H3.zw, 1.0, -H3.xyxy;        # 1-base weights
MULH H3, H3.xzxz, H3.yyww;        # bilinear filter weights
TEX H1, R2.xyxy, TEX0, RECT;      # lookup 1st sample
MULH H0, H1, H3.x;                # blend
TEX H1, R2.zyzy, TEX0, RECT;      # lookup 2nd sample
MADH H0, H1, H3.y, H0;            # blend
TEX H0, R2.xwxw, TEX0, RECT;      # lookup 3rd sample
MADH H0, H1, H3.z, H0;            # blend
TEX H1, R2.zwzw, TEX0, RECT;      # lookup 4th sample
MADH H0, H1, H3.w, H0;            # blend
```

In some embodiments, an extension such as NV_texture_rectangle may be required in order to use floating-point texture maps. On many graphics hardware platforms, texture maps are stored using a special memory encodings designed to optimize rendering performance. In current hardware, conventional texture maps usually top out at 32 bits per texel. The logic required to encode and decode 128-bit texels (and frame buffer pixels) optimally is substantially more complex. A simpler texture mapping model, such as that in NV_texture_rectangle would not necessarily require such logic.

If one tries to use an floating-point texture without a fragment program, various things may happen. There is nothing preventing one from doing this, other than the driver. It is as though the texture were disabled.

The present embodiment may interact with the OpenGL 1.2 imaging subset in various ways. The imaging subset as specified should work properly with floating-point color buffers. However, there may be places where one may extend the functionality of the imaging subset to deal with the fact that the color buffer data may extend beyond the "normal" [0,1] range.

The present embodiment may interact with SGIS_generate_mipmap in various ways. Since the present embodiment supports only texture rectangles (which have no mipmaps), this issue may be moot. In the general case, mipmaps may be generated using a 2×2 box filter (or something fancier) where components are averaged. Components should not necessarily be clamped during any such mipmap generation.

There are several things that may be considered with the use of floating-point color buffers. First, floating-point color buffers may or may not support frame buffer blending. Second, floating-point texture maps may or may not support mipmapping or any texture filtering other than NEAREST. Third, floating-point texture maps may be 1D, 2D or 3D, and may use the NV_texture_rectangle extension.

It should be noted that if extensions such as EXT_paletted_texture, SGIX_depth_texture, and NV_texture_shader are not supported, the rows in Tables #2 and #3 corresponding to texture formats defined by the unsupported extension may be removed.

While various embodiments have been described above, it may be understood that they have been presented by way of example only, and not limitation. Thus, the breadth and scope of a preferred embodiment may not be limited by any of the above described exemplary embodiments, but may be defined only in accordance with the following claims and their equivalents.

What is claimed is:

1. A method for buffering data produced by a computer graphics pipeline, comprising:
    producing graphics floating point data in a graphics pipeline;
    operating on the graphics floating point data in the graphics pipeline; and
    storing the graphics floating point data to a buffer;
    wherein the graphics floating point data includes fragment data received from a rasterizer that is read and stored in an unclamped format dictated by a graphics application program interface for increasing a parameter selected from the group consisting of a precision and a range of the graphics floating point data;
    wherein the graphics floating point data is packed in the graphics pipeline, the packing facilitating storage of at least two quantities in a single buffer in a single pass.

2. The method as recited in claim 1, wherein the fragment data includes color data.

3. The method as recited in claim 1, wherein the fragment data includes depth data.

4. The method as recited in claim 1, wherein the graphics floating point data is only constrained by an underlying data type.

5. The method as recited in claim 1, wherein the buffer serves as a texture map.

6. The method as recited in claim 1, wherein the buffer includes a frame buffer.

7. The method as recited in claim 1, wherein the packing converts "x" and "y" components of a single operand into a 16-bit floating-point format, packs a bit representation of the "x" and "y" components into a 32-bit value, and replicates the 32-bit value to each of four components of a result vector.

8. The method as recited in claim 1, wherein the packing converts four components of a single operand into a plurality of 8-bit signed quantities, the 8-bit signed quantities being represented in a bit pattern where '0' bits correspond to −128/127 and '1' bits correspond to +127/127, where a bit representation of the converted four components are packed into a 32-bit value, the 32-bit value being replicated to each of four components of a result vector.

9. A computer program product for buffering data produced by a computer graphics pipeline, comprising:

(a) computer code for producing graphics floating point data in a graphics pipeline;
(b) computer code for operating on the graphics floating point data in the graphics pipeline; and
(c) computer code for storing the graphics floating point data to a buffer,
(d) wherein the graphics floating point data includes fragment data received from a rasterizer that is read and stored in an unclamped format dictated by a graphics application program interface for increasing a parameter selected from the group consisting of a precision and a range of the graphics floating point data;
(e) wherein the graphics floating point data is packed in the graphics pipeline, the packing facilitating storage of at least two quantities in a single buffer in a single pass.

10. The computer program product as recited in claim 9, wherein the fragment data includes color data.

11. The computer program product as recited in claim 9, wherein the fragment data includes depth data.

12. The computer program product as recited in claim 9, wherein the graphics floating point data is only constrained by an underlying data type.

13. The computer program product as recited in claim 9, wherein the buffer serves as a texture map.

14. A system for buffering data produced by a computer graphics pipeline, comprising:
(a) logic for producing graphics floating point data in a graphics pipeline;
(b) logic for operating on the graphics floating point data in the graphics pipeline; and
(c) logic for storing the graphics floating point data to a buffer;
(d) wherein the graphics floating point data includes fragment data received from a rasterizer that is read and stored in an unclamped format dictated by a graphics application program interface for increasing a parameter selected from the group consisting of a precision and a range of the graphics floating point data;
(e) wherein the graphics floating point data is packed in the graphics pipeline, the packing facilitating storage of at least two quantities in a single buffer in a single pass.

15. A buffering apparatus, comprising:
(a) a buffer capable of storing graphics floating point data produced by a graphics pipeline;
(b) wherein the graphics floating point data includes fragment data received from a rasterizer that is stored in an unclamped format dictated by a graphics application program interface for increasing a parameter selected from the group consisting of a precision and a range of the graphics floating point data;
(c) wherein the graphics floating point data is packed in the graphics pipeline, the packing facilitating storage of at least two quantities in a single buffer in a single pass.

16. A system for buffering data produced by a computer graphics pipeline, comprising:
(a) means for producing graphics floating point data in a graphics pipeline;
(b) means for operating on the graphics floating point data in the graphics pipeline; and
(c) means for storing the graphics floating point data to a buffer;
(d) wherein the graphics floating point data includes fragment data received from a rasterizer that is read and stored in an unclamped format dictated by a graphics application program interface for increasing a parameter selected from the group consisting of a precision and a range of the graphics floating point data;
(e) wherein the graphics floating point data is packed in the graphics pipeline, the packing facilitating storage of at least two quantities in a single buffer in a single pass.

17. A method for buffering data produced by a computer graphics pipeline, comprising:
operating on graphics floating point data in a graphics pipeline;
producing the graphics floating point data in the graphics pipeline;
determining whether the graphics pipeline is operating in a programmable mode utilizing a command associated with a graphics application program interface;
if it is determined that the graphics pipeline is not operating in the programmable mode, performing standard graphics application program interface operations on the graphics floating point data; and
if it is determined that the graphics pipeline is operating in the programmable mode:
storing the graphics floating point data to a frame buffer, wherein the graphics floating point data includes fragment data received from a rasterizer that is read and stored in an unclamped format dictated by a graphics application program interface extension for increasing a parameter selected from the group consisting of a precision and a range of the graphics floating point data.

18. The method as recited in claim 17, wherein, in the programmable mode, the graphics floating point data is operated upon utilizing a predetermined instruction set.

19. The method as recited in claim 18, wherein, in the programmable mode, instructions of the predetermined instruction set are executed per a fragment program.

20. The method as recited in claim 17, wherein the determining is performed utilizing a command associated with the graphics application program interface.

21. The method as recited in claim 20, wherein the command is called by a program that governs operation of the graphics pipeline via the graphics application program interface.

22. A method for buffering data produced by a computer graphics pipeline, comprising:
(a) producing graphics floating point data in a graphics pipeline;
(b) operating on the graphics floating point data in the graphics pipeline; and
(c) storing the graphics floating point data to a buffer;
(d) wherein the buffer serves as a texture map;
(e) wherein the graphics floating point data is packed in the graphics pipeline, the packing facilitating storage of at least two quantities in a single buffer in a single pass.

23. A buffering apparatus, comprising:
(a) a buffer capable of storing graphics floating point data produced by a graphics pipeline;
(b) wherein the buffer serves as a texture map;
(c) wherein the graphics floating point data is packed in the graphics pipeline, the packing facilitating storage of at least two quantities in a single buffer in a single pass.

24. A method for buffering data during multi-pass rendering, comprising:
(a) operating on graphics floating point data during a rendering pass in a graphics pipeline;
(b) reading the graphics floating point data from a buffer during the rendering pass;
(c) storing the graphics floating point data to the buffer during the rendering pass; and
(d) repeating (a)–(c) during additional rendering passes utilizing results of a previous rendering pass;

(e) wherein the graphics floating point data is packed in the graphics pipeline, the packing facilitating storage of at least two quantities in a single buffer in a single pass.

25. The method as recited in claim 24, wherein the operating includes deferred shading.

26. A method for buffering data produced by a computer graphics pipeline, comprising:

produducing graphics floating point data in a graphics pipeline;

packing the graphics floating point data in the graphics pipeline; and storing the graphics floating point data to a buffer;

wherein the packing facilitates storage of at least two quantities in a single buffer in a single pass.

27. A method for buffering data produced by a computer graphics pipeline, comprising:

producing graphics floating point data in a graphics pipeline;

unpacking the graphics floating point data in the graphics pipeline; and operating on the unpacked graphics floating point data in the graphics pipeline;

wherein the unpacking facilitates storage of at least two quantities in a single buffer in a single pass.

* * * * *

UNITED STATES PATENT AND TRADEMARK OFFICE
CERTIFICATE OF CORRECTION

| | |
|---|---|
| PATENT NO. | : 7,009,615 B1 |
| APPLICATION NO. | : 10/006477 |
| DATED | : March 7, 2006 |
| INVENTOR(S) | : Kilgard et al. |

It is certified that error appears in the above-identified patent and that said Letters Patent is hereby corrected as shown below:

In the claims:
Col. 23, line 6, please replace "buffer," with --buffer;--.

Signed and Sealed this
Twelfth Day of March, 2013

Teresa Stanek Rea
*Acting Director of the United States Patent and Trademark Office*